(12) United States Patent
Manganiello et al.

(10) Patent No.: US 6,453,802 B1
(45) Date of Patent: Sep. 24, 2002

(54) CONNECTIONLESS FOOD STEAMER WITH AUTOMATIC ELECTRIC STEAM TRAP

(75) Inventors: Mark Manganiello, Everett, MA (US); Mark J. Doran, Providence, RI (US)

(73) Assignee: Market Forge Industries, Inc., Everett, MA (US)

( * ) Notice: Subject to any disclaimer, the term of this patent is extended or adjusted under 35 U.S.C. 154(b) by 0 days.

(21) Appl. No.: 10/105,179

(22) Filed: Mar. 25, 2002

Related U.S. Application Data

(60) Provisional application No. 60/279,192, filed on Mar. 27, 2001.

(51) Int. Cl.[7] ............................. A23L 1/00; A23L 3/00; A47J 27/04; A47J 27/16; F27D 7/02
(52) U.S. Cl. ............................. 99/330; 99/331; 99/467; 99/468; 99/483; 126/20; 126/369; 219/401
(58) Field of Search ........................... 99/330, 331, 337, 99/339, 340, 403–413, 467, 468, 473–476, 483, 380; 219/401, 400; 126/20, 369; 392/399, 400, 403, 405; 426/507, 510, 511, 523

(56) References Cited

U.S. PATENT DOCUMENTS

| | | | | |
|---|---|---|---|---|
| 4,856,422 A | * | 8/1989 | Meister | 99/330 |
| 5,235,903 A | * | 8/1993 | Tippmann | 99/331 |
| 5,318,792 A | * | 6/1994 | Tippmann | 426/510 |
| 5,549,038 A | * | 8/1996 | Kolvites | 99/330 |
| 5,869,812 A | * | 2/1999 | Creamer et al. | 219/401 |
| 6,107,605 A | * | 8/2000 | Creamer et al. | 219/401 |
| 6,175,100 B1 | * | 1/2001 | Creamer et al. | 219/401 |

\* cited by examiner

Primary Examiner—Timothy F. Simone
(74) Attorney, Agent, or Firm—Peter J. Manus; Dike Bronstein Roberts & Cushman

(57) ABSTRACT

A connectionless steam cooker has an insulated housing that surrounds an internal cooking compartment accessible through a door. A supply of water is held in the compartment and immerses a plate-like heating element mounted at the floor, preferably of the electrical resistance type. A steam outlet located above the maximum water level is in fluid communication with and adjacent an electrically-operated solenoid valve that is normally open to atmosphere. A temperature sensor in close physical proximity to the steam outlet and the solenoid valve closes the solenoid wherein the sensed steam temperature is at or above a set level. The outlet steam is also connected to a pair of water column pressure-responsive microswitches. One microswitch controls power to the heating element. It is set closely, e.g. to cycle between ON and OFF in response to a sensed pressure range of 1 and 3 inches of water W.C.) The second microswitch responds to a higher set pressure (e.g. 9 inches W.C.) indicative of an unsafe over-pressure to open the solenoid valve to vent the steam to atmosphere. The heating element is mounted with a tilt with respect to the horizontal water level. Two heat-sensing elements are secured on upper and lower portions of the tilted heater plate, preferably diagonally opposite corners. The temperature sensors are each set to produce an output alarm signal when the adjacent region of the heating element is not immersed in water.

13 Claims, 4 Drawing Sheets

CONNECTIONLESS FOOD STEAMER WITH AUTOMATIC ELECTRIC STEAM TRAP

This application claims the benefit of U.S. provisional application No. 60/279,192 filed Mar. 27, 2001.

BACKGROUND OF THE INVENTION

The present invention relates to a steam cooking apparatus and in particular to a connectionless steam cooker with an automatic cold air and steam outlet and close pressure control to enhance the efficiency of the cooker.

A wide variety of steam cookers are known. Market Forge Industries, Inc., the present assignee, manufactures a wide variety of steam cookers and food warmers that have found wide acceptance in the food service industry as a way to rapidly cook food, including frozen food, and/or maintain it at a serving temperature. While pressure cookers have long been used in homes and restaurants, the risks and extra costs of containing steam under high pressure have led to the growth of slow steam cookers that use steam to deliver heat to the food, but at a pressure that is typically just above atmosphere (1 to 2 inches of water). Most conventional slow (or "pressureless") steam cookers have steam generators, typically boilers external to the cooking compartment and using electrical resistance or gas heaters that produce steam from a water supply.

U.S. Pat. Nos. 5,549,038 and 5,631,033 to Kolvites and assigned to Market Forge Industries describe one implementation of a commercial slow steam cooker. The Kolvites cooker has permanent connections to a water supply and a drain. It can continuously replenish the supply of cold water. Periodically, on demand, it can draw water from the supply, heat the water to produce steam, circulate the steam in an oven chamber around the food to cook it and/or keep it warm until served, and then direct the steam and condensed water to the drain.

While such units offer many advantages, such as rapid, efficient cooking of large volumes of food, including frozen food, their disadvantages include the need for water and drain hookups, a relatively large water usage, attendant high power requirements to heat the water, and burdensome maintenance requirements such as daily, monthly and annual cleanings to remove scaling ("deliming") on heating coils, tubes and other components produced by the boiling, as well as to remove residue from the cooking process itself. These units are typically large and comparatively complex in their construction. They also are constrained in that a flow of steam is condensed to hot water that must usually be cooled before it can be drained into public sewer systems.

Another type of steam cooker, commonly termed "connectionless", avoids some of these constraints of connected cookers. Connectionless cookers, as the term suggests, do not have permanent connection to a water supply. Rather, water is added manually to the unit. It is evaporated, condensed, collected, and reused. This type of steamer can operate for comparatively long periods of time without adding additional water, and with significantly reduced water and power usage as compared to the connected steam cookers because cold water is not added on demand to form the steam, and then drained after use. An earlier steamer sold by Market Forge Industries, Inc. under the trade designation "STEAM IT" is connectionless and holds a supply of water within its heating compartment. In general, connectionless steamers cook smaller quantities of food than connected ones, but are easier to maintain, more portable, and cost less to operate.

Steam cookers of both types—connected and connectionless—use a door to gain access to the cooking compartment to add and remove the food, typically food held in one or more pans that slide onto racks mounted on the side walls of the cooking compartment. The opening and closing of this door produce a loss of steam, fluctuations in steam pressure, and introduce cold air into the compartment. The efficiency and the quality of operation of the steam cooker is dependent upon the degree to which the temperature and pressure of the steam within the cavity can be maintained at or near a preselected optimal value, or within an optimal range of values.

It is also important in all steamers to have reliable and effective controls to prevent burnout of the heater, typically caused by a low water condition. In connectionless steamers, a critical low water situation typically develops as steam is lost from the cooking compartment, and more water is boiled to replace it. (There is usually loss at least when the door is opened, and via a bleed orifice used to introduce some flow in the steam to keep it "active".) Eventually the water supply is depleted, causing the electric resistance heating element to overheat. Known connectionless steamers have water level detection arrangements, but they can fail. One particular problem is that certain foods when steam cooked release materials to the steam which collect in the condensed water and create a layer of foam on the water. This foam can interfere with the operation of the water level detectors, causing the heating element to overheat to the degree that causes permanent damage. Another problem with known connectionless steamers is that scaling (mineral deposits) produced by evaporation of the water, as well as the accumulation of residue from the cooking process, can be carried by fluids and interfere with the operation movement of moving components used to control the cooking process.

Another problem with steamers—and particularly connectionless steamers that are inherently closed systems—is that on start-up, or after the door is opened during cooking, cold air is trapped in the cooking compartment. The cold air takes heat energy from the cooking and makes the heat gradient and cooking rate within the over uneven. While mechanical steam vents, bleed orifices, check valves, and the like have been used, the rapid and controlled elimination of trapped cold air from the cooking compartment, without also losing any significant volume of steam, remains a problem.

The amount of heat produced by a steam cooker also must accommodate variations in the quantity of food, its temperature, and its surface area. A small amount of room temperature food will be cooked quickly with the steam generator powered. Continued heating will generate a dangerous overpressure and overcook the food. Various arrangements have therefore been employed to apply electrical power to a heater of a steam generator intermittently, as needed. The aforementioned Kolvites '038 and '033 patents, for example, use a pressure-sensitive switch connected in series in the power supply line. The switch responds to the steam pressure in a long outlet conduit from the oven. To control a possible dangerous outrush of steam when the oven door is opened, Kolvites provides a switch responsive to an opening of the door that opens a valve in a fresh water supply line. The resulting cold water flow quenches steam in the steam generator and also cools a mechanical steam trap to open the steam outlet line to atmosphere.

In connectionless steamers, Creamer et al, U.S. Pat. No. 5,869,812 disclosed a float switch that controls the application of power to a heater mounted under the floor of a heating chamber, adjacent a pool of water. The float switch operates by balancing atmospheric pressure on a supply of water in a reservoir external to the steam housing against the steam pressure in the cooker carried by a conduit from an upper portion of the chamber to the float switch. Depending on how this balance is struck, power to the heater is on or off. Creamer et al. slope the floor of the heating chamber to one corner to facilitate drainage of the pool of water held there. Outlet steam is condensed and cooled in the reservoir, and then gravity recirculated by a conduit back to the water pool within the heating chamber.

In U.S. Pat. Nos. 6,175,100 and 6,107,605, Creamer et al. propose a solution to the problem of cold air trapped in the connectionless cooler of the '812 patent. They place a small hole (bleed orifice) in the steam outlet conduit leading to the float valve. The hole is continuously open to atmosphere. Cold air may escape, as may steam.

It is a principal object of the present invention to provide a connectionless steam cooker that eliminates trapped cold air rapidly from the steamer while at the same time conserving water and steam and closely maintaining a preselected temperature and pressure range within the steamer.

A further object is to provide these advantages with a simple, reliable construction.

Another object is to provide a simple and reliable low-water detection system that is not sensitive to scaling, food debris or food foam.

Still another object is to provide these advantages together with ease of cleaning and maintenance, low water usage, low power consumption, and operator safety.

SUMMARY OF THE INVENTION

A connectionless steam cooker has a housing with insulated bottom, top and side inner and outer walls that define a cooking compartment or oven within the inner walls. The floor of the oven and adjacent portions of the side walls hold a supply of water. A heater, in one form a plate-like assembly of cast metal with electrical heating elements embedded therein, is secured at the floor of the housing in a water well. In one form, this securing is replaceable, using a set of threaded studs that engage holes in a peripheral flange, with an edge seal gasket to hold water in the cooking compartment. The heater is in direct contact with the water for efficient heat transfer. Operation of the heater generates steam that circulates through the oven.

A steam outlet is formed in a wall of the housing (e.g., a back wall of a cooking compartment) and in a lower half of the cooking compartment. In one form, it is located preferably immediately above the high water level in the cooking compartment so that steam generation drives cold air down to this outlet. An electrically-operated solenoid valve is connected substantially directly to the steam outlet via a branched outlet conduit. One branch leads to the solenoid valve and the other branch leads to a pressure regulation/power control system.

The solenoid valve is normally open to atmosphere. A thermostat that senses the temperature of the steam in the heating chamber is located adjacent the steam outlet, also just above the high water line. The thermostat is closely controlled to produce an output control signal when the sensed temperature is at or above a preselected set point, typically just under the boiling point of the water. This output signal closes the solenoid valve to block any significant loss of steam to the atmosphere while directing the outlet vapor via conduits to a set of pressure-sensitive microswitches. The thermostat and solenoid valve so located and so connected constitute an automatic electric steam trap that also provides a ready path to eliminate cold air from the steamer. It is also rapidly and accurately responsive to the temperature of the steam in the heating compartment, e.g., that it is 205 to 210° F. in the cooking compartment.

The second branch conduit from the steam outlet can be a single conduit that itself branches into two conduits. One branch directs the outlet vapor to a first or operating microswitch that cycles between "ON" and "OFF" states as sensed pressure moves between lower and upper preselected set pressure values, typical ones being 1 and 3 inches of water column pressure ("W.C."), the normal operating range during cooking. When the steamer is started, power is supplied through a preheat stage until it generates steam, and the steam fills the cooking compartment at the preselected operating pressure. As the sensed pressure rises to the upper limit, the first switch interrupts the supply of electrical power to the heater. As the steam then cools, the pressure falls until the falling pressure trips the lower limit of the first switch to supply power again.

The other branch conduit directs outlet steam vapor from the steam outlet to a second pressure-sensitive microswitch that is set to open the solenoid valve on rise at a pressure valve above an upper limit. For an upper limit of 3 inches W.C. at the first operating switch, a typical value of the set limit point of the second switch is 9 inches W.C. This second conduit branch and second switch is a safety feature to release steam if the pressure in the cavity exceeds a safe pressure relief. If this arrangement should fail, a check valve separate from the solenoid valve and in the second branch line from the steam outlet opens to release steam from the steam outlet to atmosphere.

The plate-like heating element is mounted within the cooking compartment at its floor or so as to be immersed in the cooking water when the steamer is operating. This provides an efficient heat transfer to the water. The heater is also tilted with respect to the horizontal (defined by the water level). This tilt is preferably along a diagonal of a rectangular plate heater so that one corner is elevated slightly with respect to the other corner. Heat sensors, e.g., snap disc type sensors, are mounted on these raised and lowered portions of the heater. As water is lost, the raised ("primary") sensor detects a temperature rise (e.g., to 310° F.) which can equal a low water condition. The switch automatically resets. If the lower sensor detects a temperature rise (e.g., to 378° F.), then it also signals a low water condition, turning off the power, and must be manually reset.

The cooking cavity has a wire rack between a lowermost pan in the cooking compartment and the maximum water level. The rack is sufficiently rigid to hold food to be warmed, sufficiently porous to promote the rise of steam into the cavity, and formed of sufficiently closely spaced wires to block an operator's hand from touching the hot water.

The power controls include a two-level power supply selector switch. In one position, the system supplies fill power to the heating element, and in the second position supplies a reduced power, e.g., 6 KW reduced to 4 KW for a three-pan sized cooking compartment.

These and other features and objects of the present invention will be better understood from the following detailed description of the invention which should be read in light of the accompanying drawings.

DETAILED DESCRIPTION OF THE DRAWINGS

DETAILED DESCRIPTION OF THE INVENTION

Figure 1:
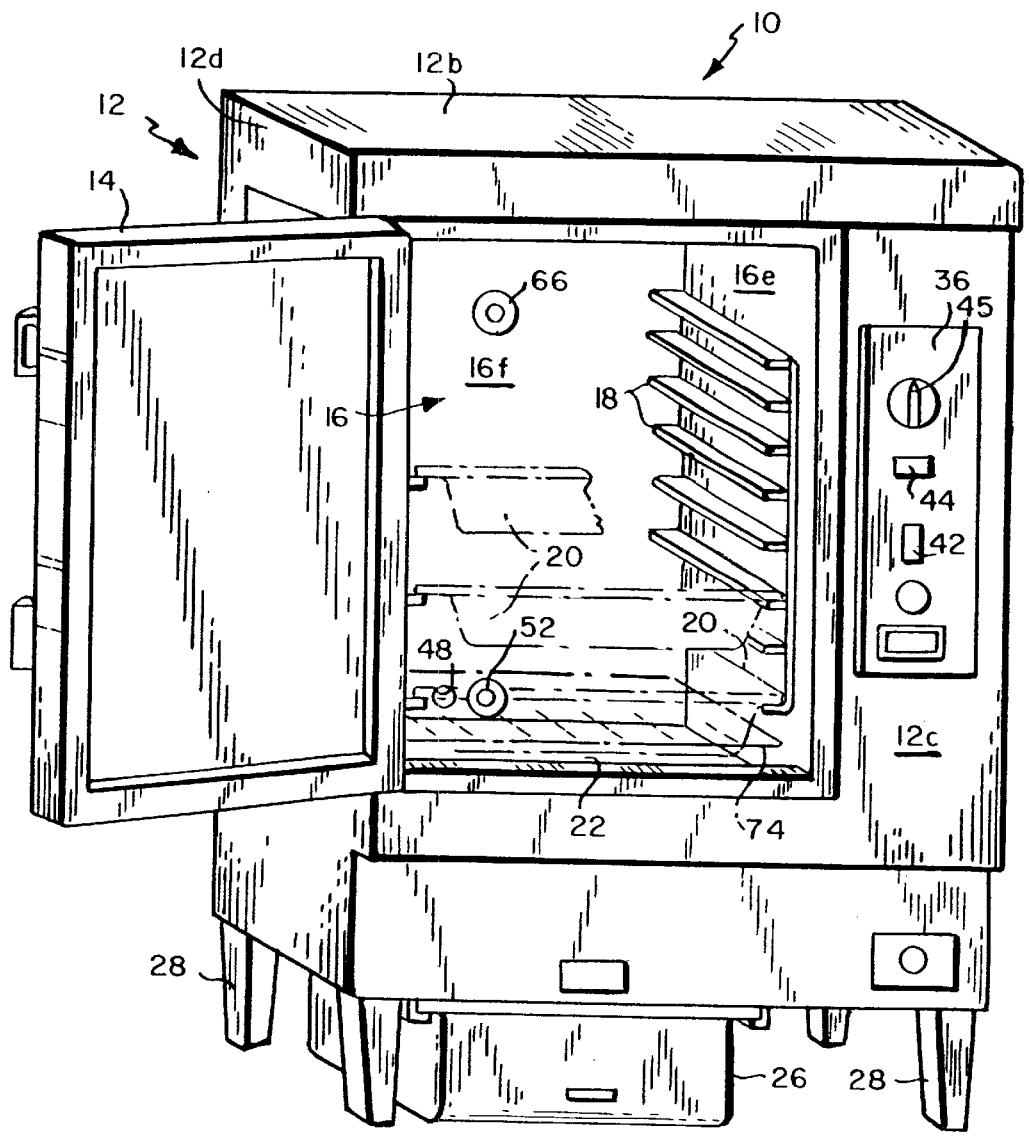
FIG. 1 is a view in perspective of a connectionless slow steam cooker according to the present invention with the door open and with pans in the cooking compartment.
Figure 2:
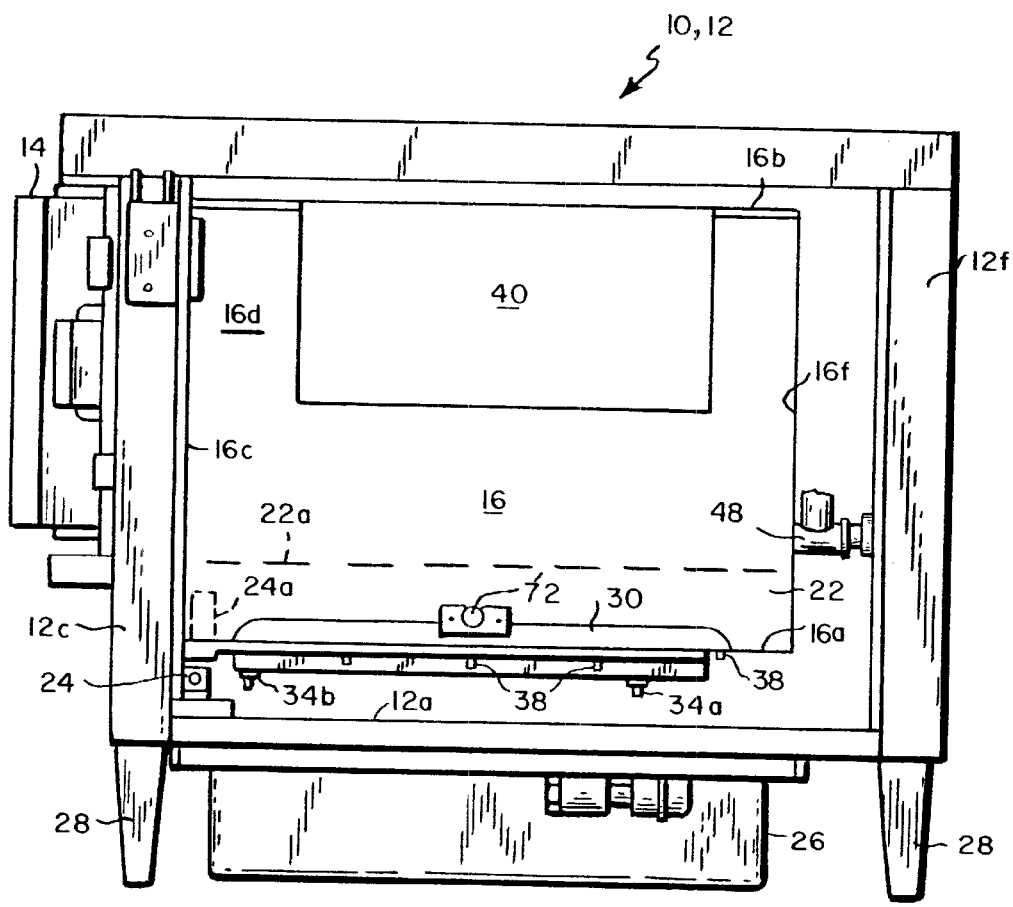
FIG. 2 is a side view in side elevation of the steam cooker shown in FIG. 1.
Figure 3:
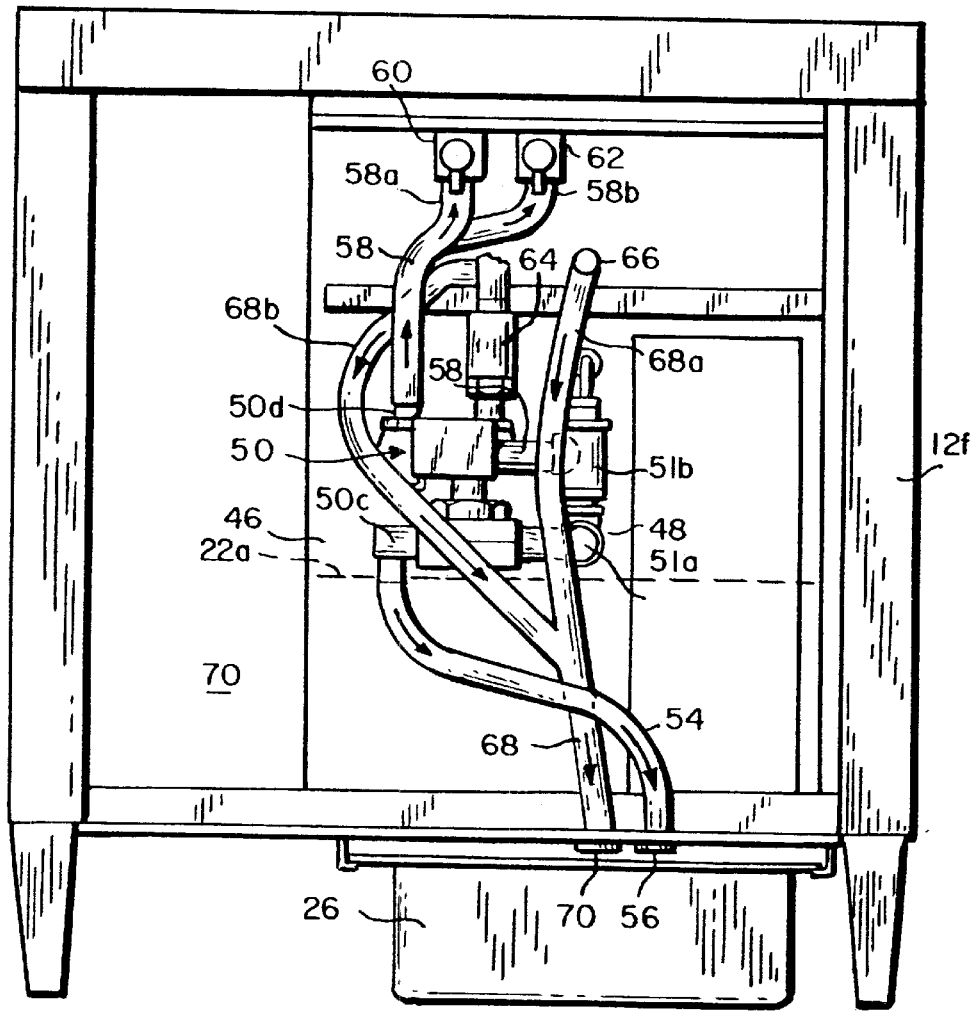
FIG. 3 is a view in rear elevation of the cooker shown in FIGS. 1 and 2.

FIGS. 1–5 illustrate one embodiment of a connectionless steam cooker 10. The cooker includes a generally rectangular outer housing 12 formed principally of stainless steel having a floor 12a, a top wall 12b, and four side walls 12c, d, e, and f. Wall 12f is the back wall of the unit; wall 12c is the front wall that mounts a door 14. As is best seen in FIGS. 2 and 3, the housing encloses a cooking compartment 16 of generally rectangular internal configuration. The inner walls 16a–f (each adjacent and generally parallel to an outer wall 12a–f with the same alphabetical reference) that define the cooking compartment are preferably insulated to retain heat and lower the energy costs for cooking. As shown in FIG. 1, the side interior walls of the cooking cavity contain a series of racks 18 which slideably receive the side edges or flanges on a set of cooking pans 20 that carry food to be cooked in the compartment 16.

The lowermost portion of the cooking compartment 16 is recessed below the lower edge of the door opening to provide a water well 32 for a supply of water 22 that is manually poured into the cooking cavity through the open door 14. An internal drain 24 provides a convenient vehicle for emptying water from the cavity. In normal operation, however, excess water that will not exit via drain 24, will discharge through a steam vent opening 48 formed in the rear wall 16f of the cooking compartment 16.

The initial water supply will be about the same regardless of the size of the cooking cavity, for example, one containing three or five standard sized cooking pans. The pans are typically 1 foot wide by 20 inches long by 2½ inches or 4 inches deep. The cooker includes a drain pan 26 slideably mounted beneath the housing outer floor 12a to collect condensate.

As shown, the cooker has four legs 28 which provide a clearance for the drain pan 26 comparible with countertop or stand mounting of the cooker (providing convenient chest-height access to the cooking cavity). A typical height for the legs is 4 inches. A typical size for a three-pan capacity steamer 10 is a overall external width of about 2 feet, a depth of about 2½ feet from front to back, and a height of approximately 25½ inches, including the legs from top to bottom for a three-pan capacity. For a five-pan capacity steamer, a typical height is 32 inches. The cooker 10 is therefore not only comparatively affordable, as compared to steam cookers which require permanent water and drain connections, but also relatively compact.

It will be understood that the water 22 is preferably a low-mineral-content water to minimize the scaling that is produced by boiling. Typically, two gallons of water are added to the cooker 10 initially using a plate-like heating element 30 that is normally immersed completely in the water. There is good heat transfer, and a relatively small amount of scaling accumulates during a day of operation (the boiling of typically 8 gallons of water.) This compares extremely favorably with typical usage rates of 30 gallons per hour for conventional connected cookers. In addition, cleaning to remove and control the build-up of scaling is much easier and much faster than with connected conventional steam cookers. Wiping the heating element with a vinegar solution at the end of the operating day is usually sufficient.

Figure 4:
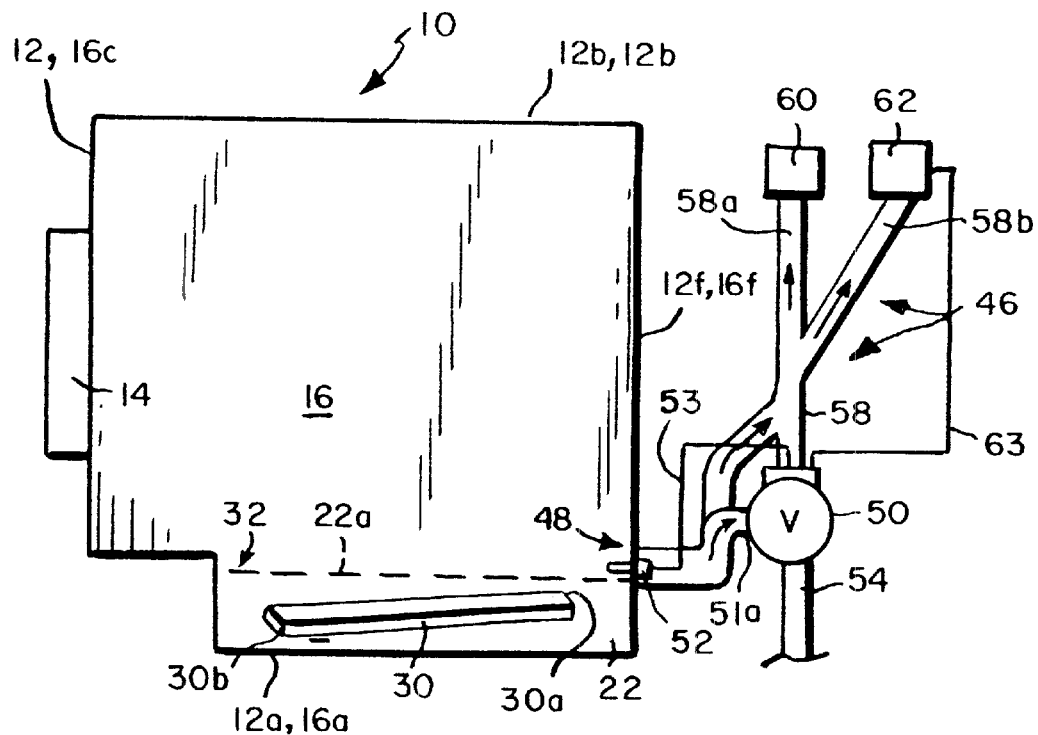
FIG. 4 is a schematic view in side elevation of the steam cooker shown in FIGS. 1–3.
Figure 5:
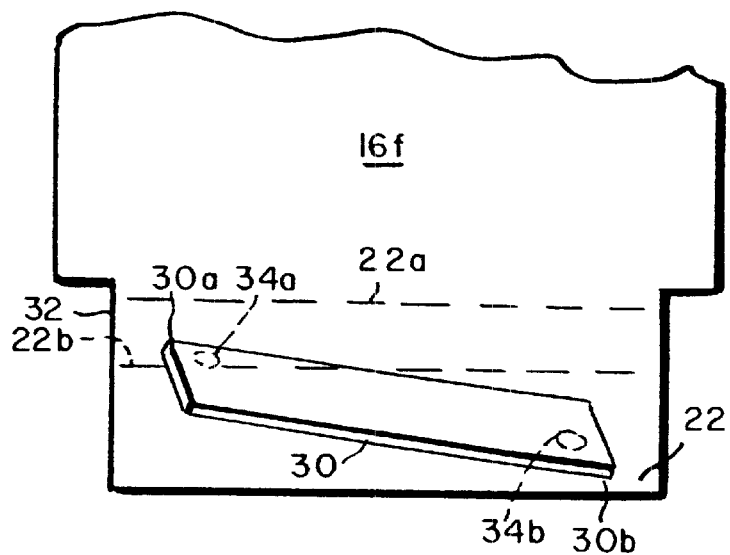
FIG. 5 is a detailed view in front elevation and partially in section of the heating element shown in FIGS. 1–4.

With a maximum supply of water 22 in the well 32, the water level is at a maximum 22a (shown in dashed line in FIGS. 1, 4, and 5). This level is sufficient to hold a supply of water which will sustain cooking for several hours of normal cooking and warming operations. The water supply is replenished when the water level falls to a level 22b (FIG. 5) where the water level no longer completely immerses the heating element.

A feature of the present invention is that the plate-like heating element 30 is tilted along a diagonal, that is, downwardly both in a back-to-front and side-to-side directions, to thereby produce an elevated corner 30a and a lowered corner 30b diametrically opposite from one another. Heat sensors 34a, 34b, e.g., of the snap-disc type, are secured to the heating element, preferably at the underside as shown. These sensors are preset to generate an electrical output signal when the sensed temperature of the adjacent portion of the heating element rises above a preselected set temperature. The elevated corner 30a and its associated sensor 34a are set at a lower temperature, e.g., 320° F., to provide a primary, automatic reset, sensing for a lower water condition within the cooker 10. If sensor 34a were to fail, and the water level continues to fall, then sensor 34b will open on temperature rise. The sensor 34b is set to produce an output signal at a further elevated temperature, e.g., 375° F., to provide a secondary low-water condition signal which requires a manual reset. Both sensors 34a and 34b can trigger a beeper on a control panel 36 at the right front of the cooker 10, or other alarm such as a warning light and/or can interrupt the supply of power to the heating element through a suitable conventional control circuit mounted on electrical control board 40.

The heating element 30 is preferably formed in the general configuration shown of cast aluminum with electrical resistance heating members imbedded therein. Its exterior surfaces are preferably nickel-plated. Projecting from its lower periphery are a set of threaded mounting studs 38 which engage suitable mating openings formed in a mounting flange forming a portion of the lower wall 16a of the cooking compartment. The heating element is sealed to this mounting flange with a suitable gasket, preferably a one-piece rubber gasket with suitable heat-resistance and sealing qualities for the given operating environment. This use of an tilt-mounted heating element and associated temperature sensors to detect water level in connection with a steam cooker provides a high degree of reliability for the low water detection system.

The cooker 10 can be connected to any standard electrical outlet found in commercial cooking establishments, e.g., one supplying 208, 220, and up to 480 volts of either one or three-phase electrical power. This power is supplied under the control of the electrical control circuitry 40 mounted internal to the cooker 10 to the electrical resistance heating elements 30. The power supply is initiated by an external manual ON/OFF control switch 42 on the front control panel 36. The control circuitry 40 includes the ability through a selector switch 44, also on the control panel 36, to provide full-power operation, e.g., 6 or 9 kilowatts for a three or five-pan cooker 10, respectively, or a low-power (power conservation) setting to supply either 4 or 6 kilowatts of maximum power input for the same three or five-pan sized cookers 10, respectively. The control panel 36 also has an external timer 45 that has a "HOLD" position where energization of the heater is under the control of a hold thermostat 72 mounted on the outside of wall 16e. The thermostat 72, e.g., of the snap-disk type, is preset at a desired "hold" temperature associated with normal operations.

Another feature of the present invention is a temperature and pressure control system, designated generally by the reference numeral 46, that provides close control over the pressure of the steam within the cooking cavity during normal operation, and which also has the added advantage of rapidly evacuating cold air from the cooking chamber to conserve power, enhance the speed of operation, and provide a stable, uniform temperature and pressure gradient within the cooking cavity. The cold air evacuation features of the system 46 are also utilized in combination with other components of the pressure-regulating system, as described below, to provide overpressure relief.

The system 46 includes the steam vent opening 48 formed in the rear wall 16f at a point in the lower half of the cooking cavity 16, and preferably at or closely spaced above the high water level 22a. This location ensures that as steam is generated and rises within the cavity, the trapped cold air within the cavity when the door is closed is forced downwardly to a region adjacent the vent opening 48 where it can exit. Immediately adjacent this vent opening is a solenoid valve 50, which can be best seen in FIG. 3. The vent 48 feeds branched outlets 51a and 51b in direct fluid communication with the steam vent port opening 48. Outlet branch 51a directs the vented fluids to the solenoid valve 50 which is electrically actuated to close from a normally open position in response to the presence or absence of an output signal from a thermostat 52 (best seen in FIG. 1).

In its normally open position, the valve 50 is a low-resistance flow path from the cooking chamber, via vent 48, to atmosphere, via the valve outlet drain port 50c. A drain conduit 54 directs the outlet steam, condensed water, and any solid matter carried by the steam or water to the drain pan 26 via a drain port 56. This port is formed in the housing floor 12a, but at a point exterior to a rear wall 16f of the cooking compartment which holds the water 22 in the water well 32 inside the cooking compartment. The thermostat 52 is located in a lower portion of the steam compartment, and preferably, as shown, closely spaced from the steam vent opening 48 and at generally the same horizontal level as the steam vent opening 48. Both are preferably slightly above the high water level 22a within the cooking compartment. This location and relationship with respect to the steam vent opening allows the thermostat to sense the temperature of the vapor at the outlet port, particularly during the preheat cycle after the steam cooker is first powered. As noted above, during this preheat period the generation of steam drives cold air to the outlet port. The thermostat 52 senses the temperature of this air and then its increasing temperature. The thermostat is set at a preselected temperature just below that of the boiling point of water, and with a tight tolerance (a typical value being 200° F.±7° F.). When this temperature is sensed, the thermostat generates an output signal which is applied to the solenoid valve 50 over line 53, causing the valve to close. The thermostat and solenoid valve so positioned form a reliable and accurately responsive electric steam trap that rapidly evacuate cold air from the heating chamber during the preheat period, and then retain to a high degree the steam that is generated.

In its closed position, the solenoid valve 50 blocks an outlet flow via branch 51a in favor of branch 51b. Steam exiting the cooking compartment via the steam vent opening 48 and branch 51b is in fluid communication with a conduit 58. This conduit has branches 58a and 58b that in turn are in fluid communication with miniature pressure switches 60 and 62, respectively, mounted on the upper outer surface of the rear wall 16f of the cooker 10. The microswitch 60 cycles between ON and OFF positions in response to a sensed water column (W.C.) pressure of the steam at the outlet vent port 48, as conducted via conduit 58, to regulate the application of electrical power to the heating element 30 (whether at a high or low setting set by the selector switch 44). The preselected set points for operation of the switch 60 maintain the steam pressure for cooking or warming within a closely-controlled range. A typical value for this range is 1 to 3 inches of water column pressure, which is about equivalent to blowing bubbles through a straw immersed in a glass of water. If the water column pressure falls below 1 inch, the switch 60 closes, which applies electrical power to the heating element. If the switch 60 senses a pressure of 3 inches W.C. or more, it opens to interrupt the supply of power to the heating element 30.

Simultaneously, the conduit branch 58b directs the same sensed outlet steam pressure to a second miniature pressure microswitch 62 which is set at a higher set point, e.g., 9 inches of W.C. pressure. The switch 62 is preset to open on rise at this preset value to send an output signal over line 63 to operate the solenoid valve 50, causing it to open. This rapidly releases any unsafe pressures that may develop within the cooking compartment.

The microswitch 62, in addition to providing overpressure protection, also assists in responding to sudden pressure fluctuations associated with opening the door 14 or closing it, particularly a slam closing. A pressure spike that is sensed at more than the preselected set pressure of the switch 62, e.g., 9 inches W.C., will generate a signal that opens the solenoid valve 50 to dissipate the pressure spike. When the pressure spike dissipates, the switch then rapidly closes the solenoid valve 50, and the switch 60 resumes control of the pressure regulation within the cooking cavity. In addition, if any significant amount of cold air has entered the cooking cavity while the door is open, then the thermostat 52 will sense the accumulation of cold air at the bottom of the cooking compartment and may, depending on whether or not the temperature has fallen sufficiently low, also open the valve 50 to vent the cold air.

The system 46 also includes a check valve 64 in fluid communication with the conduit 68b and branch 51b such that should the valve 50 remain in the closed position in an overpressure situation, the check valve will open, causing a venting of the overpressure to atmosphere directly through the solenoid valve 50 and the check valve 64 and drain line 68 to a drain port 70. For the illustrative pressure values given hereinabove as typical, the check valve has a preset trip pressure of ½ psi (pounds per square inch). The temperature and pressure control system 46 as described provides rapid, efficient, and well-controlled heating of the cooking compartment while also providing a high degree of safety. In addition, all of the components of the system 46 are conventional components and they are readily accessible for inspection and/or maintenance.

It should be noted that the cooker also includes a small bleed vent orifice 66 formed in the rear wall 16f of the cooking compartment which feeds a branch 68a of a drain conduit 68. The branch 68b of the conduit 68 connects the outlet of the check valve 64 to the port 70. The bleed orifice is very small to retain most of the steam within the cooking compartment while allowing a small bleed-off of the steam to keep the steam moving and "live" within the cooking compartment. A typical diameter of the orifice is in the range of 0.08 to 0.09 inch.

Given the large surface area of the heating element 30, and given the wattages of electrical power applied to the heating element, it will be evident to those skilled in the art that the heating element 30 has a comparatively low wattage density. This is important in controlling possible damage to the heating element through thermal shock, as comparatively cold water is added to the water well to replenish the supply while the heating element is still hot.

FIG. 1 also illustrates a rack 74 secured within the cooking cavity at a point below the bottom of the lowermost pan held in the cooking cavity and above the maximum water level 22a. This rack is formed of an open pattern of stiff wire, akin to a conventional oven rack. It has sufficient structural strength to hold a plate or plates of food for warming while also having a sufficiently opened structure so as not to impede the flow of steam from the water supply 22 into the cooking compartment. The spacing between the wires forming the rack preferably is sufficiently close that an operator cannot readily pass his hand or fingers therebetween to touch the heated water 22. If permanently installed or routinely left in place, the rack 74 thus also enhances operator safety.

The steam cooker 10 as described above thus provides all of the known advantages of connectionless cooking while improving the efficiency, reliability and safety of connectionless cooking operation, as well as providing extreme ease in cleaning and routine maintenance, particularly accessibility to the heating elements and interior surfaces where deliming or cooking residue removal is required. The control system provide a close degree of control over the operating conditions within the cooking cavity, including pressure spikes associated with opening and closing the access door, and the problem of eliminating cold air which is present initially in the cooking compartment and may be added as the door is opened to gain access to the food being cooked. The present invention offers good power usage and water usage characteristics. In particular, the present invention avoids problems associated with control systems relying on the movement of mechanical parts that are exposed to and can be degraded by the presence of particulate matter such as scaling particles which are carried by the steam or condensed water. In particular, the present cooker and its regulation system does not utilize any recirculation of water from the cooking compartment through the regulating system. Any steam that exits the cooking compartment through the steam outlet opening 48 and condenses will almost entirely be drained to the drain pan 26, not returned to the water supply 22.

While the invention has been described with respect to its present preferred embodiments, it will be understood by those skilled in the art that various modifications and alterations will occur from reading the foregoing specification in light of the accompanying drawings. For example, while the invention has been described with respect to a system utilizing a drain pan, the drain ports 56 and 70 could be permanently connected to a drain line. Further, the system 46 could be utilized in conjunction with other known heating elements, e.g. gas-fired, and other known water level control arrangements. Further, it will be understood that the particular configuration of the interconnections of the components forming the temperature and control system 46 can assume a variety of forms and utilize components a variety of sizes and manufacturing types, provided that they operate in conformity with the operating principles described hereinabove. For example, the thermostat and steam vent port may be located farther apart, or at less than a precise horizontal alignment, or at a point raised farther above the maximum water level 22a, but all with associated reductions in the faithfulness with which the system senses the actual temperature and pressure within the cooking compartment, particularly at its lowest point, and therefore less faithfully controls the operating parameters within the cooking compartment to the desired optimal levels. These and other modifications are intended to fall within the scope of the appended claims.

What is claimed is:

1. A connectionless steam cooker comprising:
    A) a housing,
    B) a cooking compartment located within the housing that is accessible through a door mounted on the housing, said cooking compartment holding a supply of water,
    C) a heating element disposed to heat said water supply to produce steam in said cooking compartment,
    D) a steam outlet formed in said housing and in fluid communication with the interior of said cooking compartment at a point above the level of said water supply, and
    E) an automatic electric steam trap connected to said steam outlet, said steam trap being normally open to the atmosphere, and closing when the temperature of the steam in the cooking cavity measured adjacent said steam outlet is at or over a preselected operating temperature.

2. The steam cooker of claim 1 wherein said electric steam trap comprises a temperature sensor mounted in said housing to sense the temperature of said steam in said cavity, and a normally-open solenoid valve that is open to atmosphere.

3. The steam cooker of claim 2 wherein said temperature sensor and said solenoid valve are adjacent one another and said vapor outlet.

4. The steam cooker of claim 3 wherein the floor of said heating compartment holds said water supply and said temperature sensor and vapor outlet are located in a lower half of said cooking compartment, immediately above the maximum water level of said water supply.

5. The steam cooker of claim 4 wherein said temperature sensor is closely regulated.

6. The steam cooker of claim 5 wherein said preselected operating temperature is about 200° F.±7° F.

7. The connectionless steamer according to any of the foregoing claims further comprising a controller for the operation of said heating element, said controller being responsive to the steam pressure at said outlet.

8. The steam cooker of claim 7 wherein said controller comprises a first water-column-pressure (WC)-actuated microswitch operatively coupled via a first conduit to said steam pressure at said steam outlet and set to control the degree of energization of said heating element to maintain said steam pressure within said cooking compartment within a closely-controlled operating range.

9. The steam cooker of claim 8 wherein said controller further includes a second water-column-pressure (WC)-actuated microswitch operatively coupled via said first conduit to the steam pressure at said steam outlet, but operable to produce an output control signal at a set pressure in excess of said closely-controlled range of pressures.

10. The steam cooker of claim 9 wherein said operative coupling includes a branched conduit in fluid communication between said steam outlet and said first and second microswitches.

11. The steam cooker of claim 1 wherein said heating element has a generally plate-like configuration and is mounted on the floor of said cooking compartment with a tilt from the horizontal, and further comprising temperature-sensing members disposed at raised and lowered ends of said tilt-mounted heater plate an set to produce an output signal when the sensed heater temperature rises to a level indicative of the absence of water at the adjacent portion of said heating plate.

12. The steam cooker of claim 10 wherein said temperature-sensing members are of a snap disk type.

13. The steam cooker of claim 1 wherein said heating element comprises at least one electric resistance heating member embedded in a plate of cast aluminum.

* * * * *